(12) United States Patent
Shin et al.

(10) Patent No.: US 6,434,713 B1
(45) Date of Patent: Aug. 13, 2002

(54) PROCESSOR MANAGEMENT METHOD OF MOBILE COMMUNICATION HOME LOCATION REGISTER (HLR) SYSTEM

(75) Inventors: Hak-Jae Shin, Suwon; Sung-Ah Kim, Seoul, both of (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/385,435

(22) Filed: Aug. 30, 1999

(30) Foreign Application Priority Data

Sep. 3, 1998 (KR) ............................. 98-36691
Sep. 7, 1998 (KR) ............................. 98-36813

(51) Int. Cl.[7] ................................................. H04L 1/22
(52) U.S. Cl. ........................................... 714/25; 710/15
(58) Field of Search .............................. 714/25, 27, 32, 714/39, 43, 47; 379/133, 111; 710/15, 18, 19

(56) References Cited

U.S. PATENT DOCUMENTS

| | | | | |
|---|---|---|---|---|
| 5,560,033 A | * | 9/1996 | Doherty et al. | 395/800 |
| 5,663,963 A | * | 9/1997 | Goodwin, III | 371/5.1 |
| 5,776,056 A | * | 7/1998 | Bu et al. | 600/301 |
| 5,878,064 A | * | 3/1999 | Goodwin, III | 371/68.2 |
| 5,925,137 A | * | 7/1999 | Okanoue et al. | 714/4 |
| 5,943,232 A | * | 8/1999 | Gehi et al. | 364/184 |
| 6,134,216 A | * | 10/2000 | Gehi et al. | 370/231 |
| 6,138,016 A | * | 10/2000 | Kulkarni et al. | 455/433 |
| 6,148,339 A | * | 11/2000 | Nagamatsu et al. | 700/224 |
| 6,160,875 A | * | 12/2000 | Park et al. | 379/133 |
| 6,327,361 B1 | * | 12/2001 | Harshavardhana et al. | 370/230 |

* cited by examiner

Primary Examiner—Nadeem Iqbal
(74) Attorney, Agent, or Firm—Fleshner & Kim, LLP

(57) ABSTRACT

The present invention relates to a method of managing application processor in a mobile communication HLR system. Also, an object of the present invention is to provide a processor management method for a mobile communication HLR system that performs an appropriate process by analyzing a state of an application processor when there is no response from the application processor with respect to a health check message. Another object of the present invention is to provide a processor management for a mobile communication HLR system that minimizes a system malfunction time due to an overload, when a state of an application processor is determined to be an overload state, by analyzing the overload to thereby obtain detailed information and performing an overload recovering function corresponding to the obtained information. Still another object of the present invention is to provide a processor management for a mobile communication HLR system that enables another system engaged with the mobile communication HLR system to efficiently manage an overload thereof by transmitting an overload message including overload information.

20 Claims, 4 Drawing Sheets

| M_Type | Sys_Number | OverLoad_1 | OverLoad_2 | OverLoad_Level | OverLoad_Description |

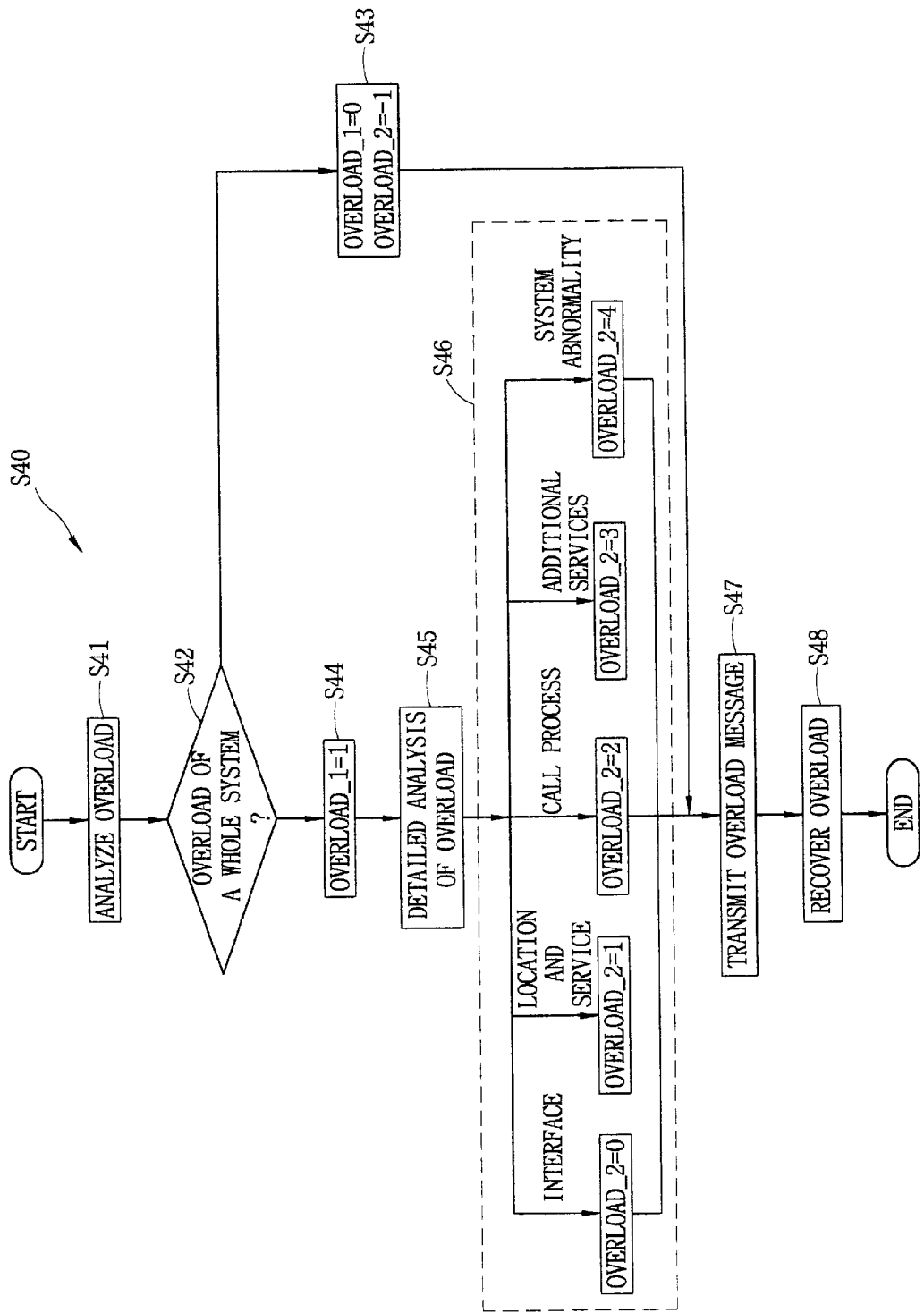

PROCESSOR MANAGEMENT METHOD OF MOBILE COMMUNICATION HOME LOCATION REGISTER (HLR) SYSTEM

BACKGROUND OF THE INVENTION

1. Field of the Invention

The present invention relates to a mobile communication HLR system, and more particularly to a method of effectively managing application processors in the HLR system.

2. Description of the Conventional Art

Many application processors exist in a mobile communication HLR system and also there are processor management blocks to manage the application processors.

Here, the processor management blocks mainly perform a self-processor control function, an operator terminal control function, and a network management center control function. Specifically, the self-processor control function relates to periodically checking processor health, monitoring a program starting condition by checking a lock file, checking and clearing an overload of a message queue, recovering a processor in an obstruction, and managing an HLR local sub system, the operation terminal control function relates to reporting a processor condition, suspending and starting a processor, and reporting a processor malfunction and recovery, and the network management center control function to reporting a processor condition, and reporting a processor malfunction and recovery.

According to an entire operation of the processor management blocks, for example, the processor management blocks check the existence and validity of the application processors related to the system through an initialization and perform a health check every 2 seconds for the periodical application processor management followed by the overload check, the lock file check and the message management. Here, when there is no response from the corresponding application processors for a predetermined time, it is considered to be a timeout and thus the processor management blocks suspend and then restart the application processors.

However, in the conventional art, an abnormal condition may occur due to various reasons in the mobile communication HLR system. The conventional mobile communication HLR system checks health conditions of the application processors therein and a health check processing unit of the processor management block checks a condition of each application processor to process the abnormal condition.

To check the health of the application processor the health check processing unit outputs a health check message to the application processor and if there is no message from the corresponding application processor responding to the health check message, the health check processing unit considers that the application processor is in the abnormal condition and thus suspends and restarts the application processor to solve the abnormality of the application processor.

However, during which the system is actually operated, the application processor is in an overload or a message processing state, and thus a message may not be temporarily transmitted, but in such a condition the conventional HLR system unnecessarily suspends and restarts the corresponding application processor, which results in an inefficient system management.

SUMMARY OF THE INVENTION

Accordingly, the present invention is directed to a processor management method for a mobile communication HLR system which obviates the problems and disadvantages in the conventional art.

An object of the present invention is to provide a processor management method for a mobile communication HLR system that performs an appropriate process by analyzing a state of an application processor in the management of application processors existing in the mobile communication HLR system when there is no response from the application processor with respect to a health check message.

Another object of the present invention is to provide a processor management for a mobile communication HLR system that minimizes a system malfunction time due to an overload, when a state of an application processor is determined to be an overload state, by analyzing the overload to thereby obtain detailed information and performing an overload recovering function corresponding to the obtained information.

Another object of the present invention is to provide a processor management for a mobile communication HLR system that enables another system engaged with the mobile communication HLR system to efficiently manage an overload thereof by transmitting an overload message including overload information.

To achieve these and other advantages and in accordance with the purpose of the present invention, as embodied and broadly described herein, there is provided a processor management method for a home location register (HLR) system which includes transmitting a health check message to a processor and counting a health check count until a response message with respect to the health check message is received, comparing the health check count with a first predetermined time to judge whether the system is in an overload state or not and accordingly performing a processor processing function, comparing the health check count with a second predetermined time to judge whether the system operates or not and accordingly performing a processor processing function, and comparing the health check count with a third predetermined time to judge whether the system is abnormal or not and accordingly performing a processor processing function.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a flowchart illustrating an overload processing step in FIG. 2.

DETAILED DESCRIPTION OF THE INVENTION

Reference will now be made in detail to the preferred embodiments of the present invention, examples of which are illustrated in the accompanying drawings.

Figure 1:
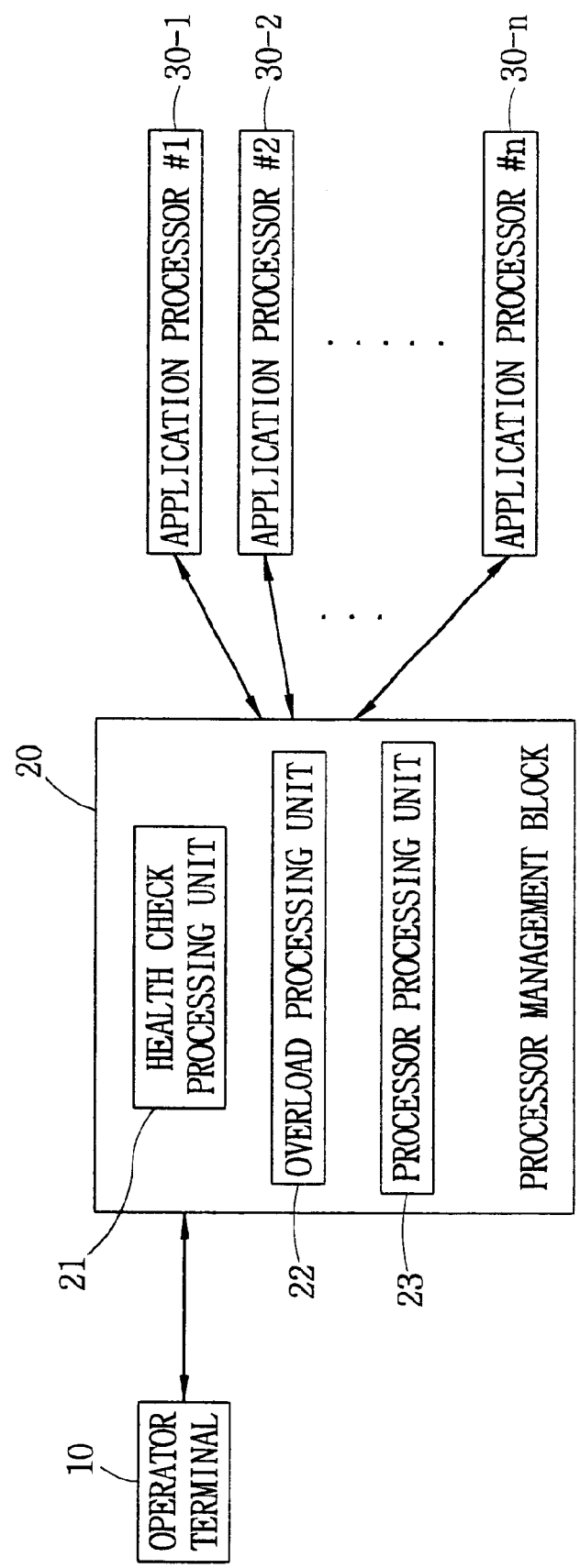
FIG. 1 is a schematic block diagram of a mobile communication HLR system according to the present invention.

As shown in FIG. 1, a mobile communication HLR system according to the present invention is mainly provided with an operator terminal 10, a processor management block 20 and a plurality of application processors 30-1~30-n, the operator terminal 10 controlling the processor management block 20. The processor management block 20 which checks states of the application processors 30-1~30-n includes a health check processing unit 21, an overload processing unit 22 and a processor processing unit 23.

More specifically, the health check processing unit 21 periodically judges the states of the application processors 30-1~30-n using a health check message, the overload processing unit 22 periodically checks message queues of the application processors 30-1~30-n and, when it is in an overload state, performs a process corresponding to the overload state, and the processor processing unit 23 checks the existence and operation of the application processors 30-1~30-n, thereby performing a corresponding process.

Each of the application processors 30-1~30-n processes various functions related to the location and service authority of a mobile user, a call process, additional services and an external interface.

Figure 2:
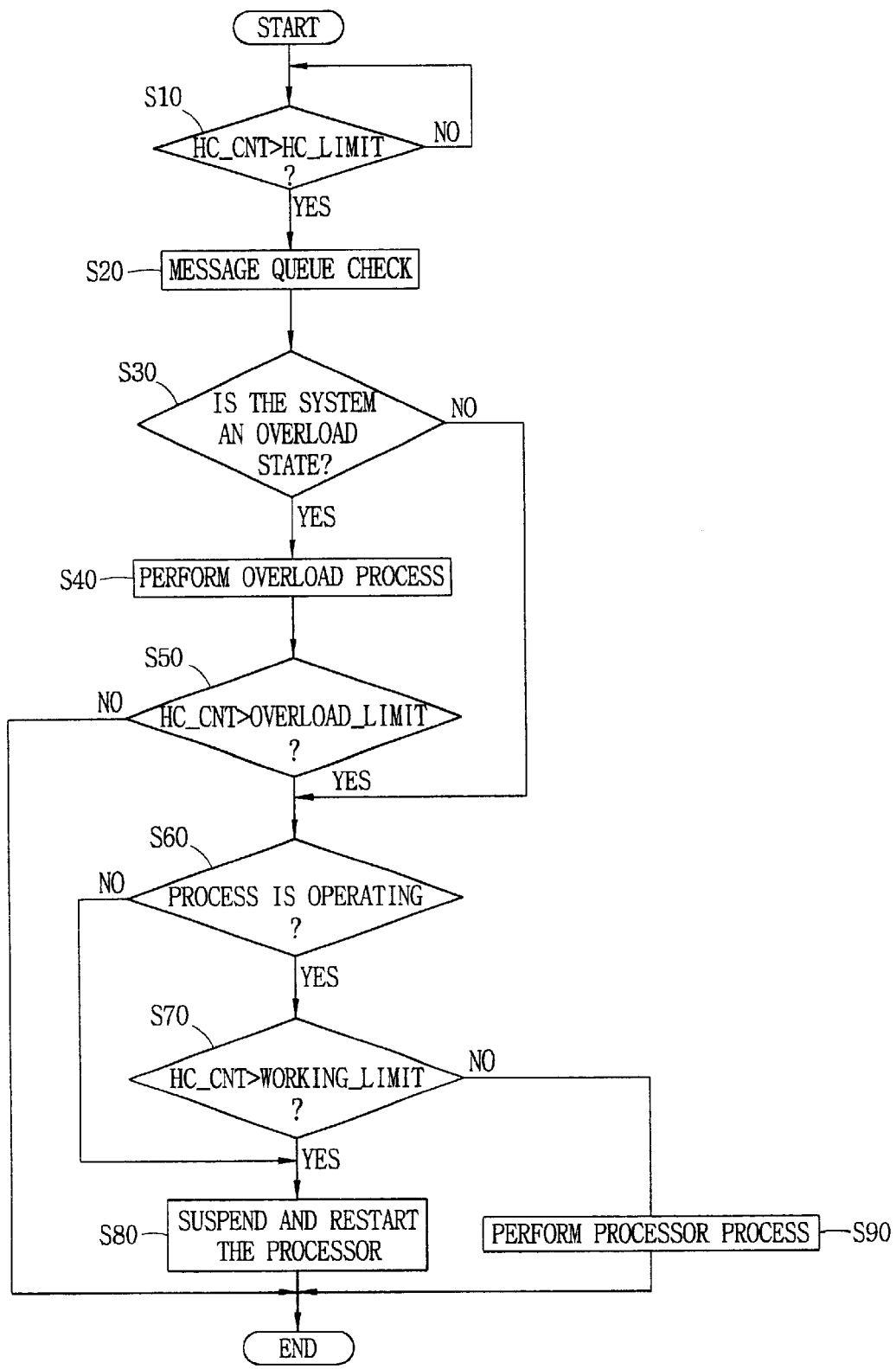
FIG. 2 is a flowchart illustrating a processor management process in a mobile communication HLR system according to the present invention.

With reference to FIG. 2, an entire processor management operation of the mobile communication HLR system according to the present invention will be described in detail.

First, when the processor processing unit 23 of the processor management block 20 checks the existence and validity of the application processors 30-1~30-n related to the system through the initialization, an operation of checking the health of each of the application processors 30-1~30-n is performed by the health check processing unit 21.

The health check processing unit 21 periodically generates and outputs a health check message to the application processors 30-1~30-n which currently exist in the system, with starting counting by operating a health check counter. Next, when a response message with respect to the health check message is inputted from the corresponding application processor 30-1~30-n, the health check processing unit 21 controls the health check counter to complete the time count and initializes the corresponding health check counter.

Here, the processor management block 20 of the mobile communication HLR system performs a process with respect to the state of the processor. Thus, the health check processing unit 21 of the processor management block 20 compares a health check count time hc_cnt which is counted by the health check counter provided therein with a health check limit time health_limit (S10).

If the health check count time hc_cnt exceeds the health check limit time health_time, that is, when no response message is inputted from the application processor 30-1~30-n which receives the health check message and thus the health check count time hc_cnt is continuously counted exceeding the health check limit time health_limit, the overload processing unit 22 of the processor management block 20 checks the message queues of the application processors 30-1~30-n (S20)

As a result of checking the message queues, the overload processing unit 22 determines whether the system is in an overload state (S30). For instance, when a message storage volume of each message queue exceeds a first limit message volume (a limit message storage volume of a message queue with respect to each application processor that is 65,535 byte in a current system), or when a message volume stored in the message queues of all of the application processors 30-1~30-n exceeds a second limit message volume (a limit message sum total volume with respect to the message queues of all of the application processors which is about 120,000 byte in the current system), or when the number of messages exceeds the number of limit messages (the number of messages that can be stored in the message queues which is 2400 in the current system), the overload processing unit 22 determines that the system is in the overload state.

In the step S30, when the system is determined to be in the overload state, the health check processing unit 21 waits longer than a normal time, that is, the health check limit time health_limit until the response message to the health check message is inputted, since the health check processing unit 21 is not able to receive and transmit health check messages with the application processors 30-1~30-n. At this time, the overload processing unit 22 of the processor management block 20 analyzes a cause of the overload and thus performs a corresponding overload process (S40). The step S40 illustrated in FIG. 5 will be later described in more detail.

The health check processing unit 21 compares the health check count time hc_cnt counted by the health check counter provided therein with an overload process limit time overload_limit in accordance with the overload (S50). If the health check count time hc_cnt does not exceed the overload process limit time overload_limit, the operation is completed, and if the health check count time hc_cnt exceeds the overload process limit time overload_limit, that is, if no response message is inputted from the application processors 30-1~30-n that received the health check message and thus the counting is continuously carried out although the health check count hc_cnt exceeds the overload process limit time overload_limit, the processor processing unit 23 of the processor management block 20 checks whether the application processors 30-1~30-n operate to process the message (S60).

On the other hand, in the step S30, if it is considered that the system is not in the overload state, the step 60 (S60) is performed to check whether the application processors 30-1~30-n are operating to process the message.

In the step 60 (S60), if the application processors 30-1~30-n are operating, the application processors 30-1~30-n may not be able to transmit the response message to the health check message for processing a message which requires a long processing time, thus the health check processing unit 21 compares the health check count time hc_cnt counted by the health check counter with a processor operation limit time working_limit in accordance with a message process of the processors (S70).

If the health check count time hc_cnt exceeds the processor operation limit time working_limit, that is, when no response message is inputted from the application processor 30-1~30-n which receives the health check message and thus the health check count time hc_cnt is continuously counted until exceeding the processor operation limit time working_limit, the processor management block 20 determines that the corresponding application processor 30-1~30-n abnormally operates, and thus suspends and restarts the corresponding application processor 30-1~30-n (S80).

While, in the step 60 (S60), if the application processor 30-1~30-n does not operate, the step S80 is performed and thus the processor management block 20 suspends and restarts the corresponding application processor 30-1~30-n.

While, in the step 70 (S70), if the health check count time hc_cnt does not exceed the processor operation limit time working_limit, that is, if the response message is inputted from the application processor 30-1~30-n which receives the health check message within the processor operation time working_limit, the health check processing unit 21 controls the health check counter to complete the health check count hc_cnt, and the processor processing unit 23 performs a processor process function of eliminating messages existing in the corresponding application processor 30-1~30-n (S90) and then completes the processor management operation of the mobile communication HLR system.

The overload occurred in the system may entirely or partially relate to the system. Thus, if all of the overload condition are considered to be related to the entire system and uniformly managed, it takes a long time to return the overload to the normal condition, which lengthens the system malfunction time.

Accordingly, in the processor management method of the mobile communication HLR system according to the present invention, if the overload occurs, the HLR system analyzes which function group produces the overload and accordingly obtains a detailed overload information from the analysis, while managing the processor by each function group and periodically performing an overload checking operation, thereby performing the overload recovery function. Further, the processor management method of the mobile communication HLR system according to the present invention efficiently copes with the system overload problem by transmitting the overload message in which the overload information is included to the other linked systems.

Figures 3, 4:
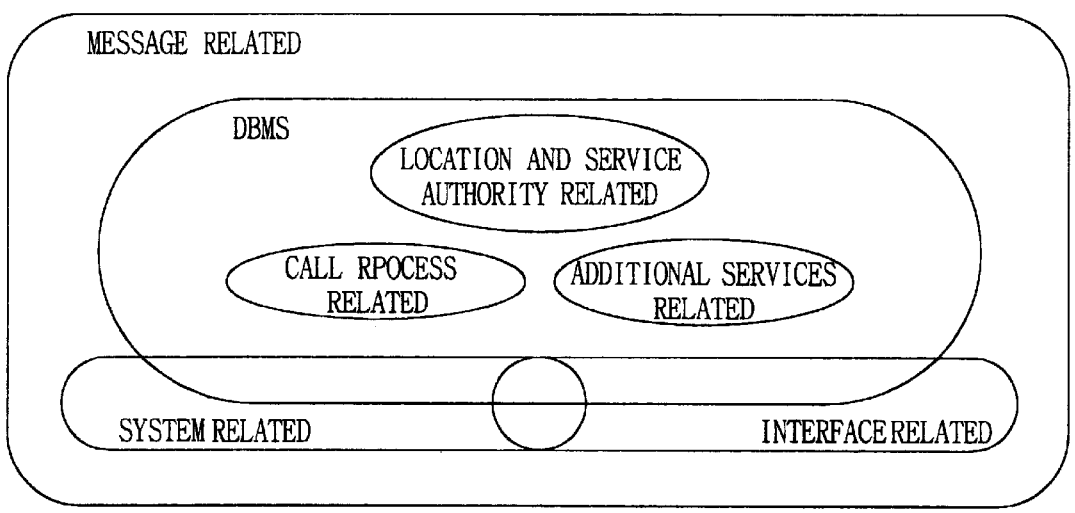
FIG. 3 is a diagram sorting functions of an application processor according to the present invention.
FIG. 4 is a diagram illustrating an overload message configuration according to an embodiment of the present invention.

Further, in the present invention the application processors in the mobile communication HLR system are divided into two parts, processors that use messages and the other processors that do not use the messages, and the processors using the messages are again subdivided according to their functions, as in FIG. 3, to obtain a type of the message overload and additional information thereof.

As shown in FIG. 3, the processors are divided in relation to a data base management system (DBMS), a system and an external interface, and the processors related to the DBMS are subdivided in relation to call processes, location and service authority and additional services.

If overload occurs in such application processors divided according to their functions, the application processors transmit the overload message indicating the overload state to the other systems. FIG. 4 illustrates an example of the overload message to indicate the overload information.

As shown therein, the overload message consists of a field 'M_Type' indicating the overload message, a field 'Sys_Number' indicating a number of a system wherein the overload occurs, a field 'OverLoad_1' indicating a general classification of the overload, a field 'OverLoad_2' indicating a type of the overload in detail, a field 'OverLoad_Level' indicating a level of the overload, and a field 'OverLoad_Description' describing the overload.

With reference to FIG. 5 which illustrates the overload processing step S40 of FIG. 4 in more detail, the message overload processing operation in the mobile communication HLR system according to the present invention will be described.

First, when the overload occurs in the system, the overload processing unit 22 of the processor management block 20 analyzes the overload occurred (S41) and thus determines whether the overload occurred in the system relates to the entire system or a part thereof (S42).

If the overload is in relation with the entire system, the overload processing unit 22 sets a predetermined value corresponding to the overload of the entire system, for example, '0', in the field 'OverLoad_1' which is the overload classification field of the overload message and '−1' in the field 'OverLoad_2', the overload type field (S43).

While, when the system is partially overloaded, the overload processing unit 22 sets a predetermined value corresponding to the partial overload of the system, for example, '1', in the field 'OverLoad_1' (S44), and identifies a type of the overload occurred in the system, that is, an interface related overload, a location and service related overload, a call process related overload or an additional service related overload, by analyzing the content of the overload (S45).

The overload processing unit 22 sets a predetermined value corresponding to the overload type field 'OverLoad_2' of the overload message in accordance with the result analyzed in the step 45 (S45). For example, the overload processing unit 22 sets, in the overload field 'OverLoad_2', '0' in the interface related overload, '1' in the location and service related overload, '2' in the call process related overload, '3' in the additional service related overload, and '4' in the system related overload.

Further, the overload processing unit 22 sets an overload level OverLoad_Level and an overload description OverLoad_Description with respect to the overload that occurs. Here, the overload level OverLoad_Level is set as 'Level_1' at the time when it is determined to be the overload state. Further, the overload processing unit 22 determines the overload condition at regular intervals and when it is continuously determined to be the overload condition, the overload level OverLoad_Level increases by ones. When returning to the overload to a clear state, if a message volume of the message queues does not exceed the limit value, a clean count clean_cnt periodically increases and then when the clean count clean_cnt reaches a certain value, the overload is returned to the clear state.

The overload processing unit 22 transmits the thusly set overload message to the other linked systems (S47) and finally recovers the overload that occurs in the system by performing an overload processing algorithm in accordance with the type of the overload which is analyzed (S48).

As described above, in the processor management method of the mobile communication HLR system according to the present invention, by periodically performing the health check operation, when there is no response from the HLR system with respect to the health check message within the certain time, the appropriate process is taken by grasping the operation of the corresponding application processor and the overload condition of the system without unconditionally suspending and restarting the application processor, thus the present invention has an effect of minimizing the system malfunction.

Further, the processor management method of the mobile communication HLR system according to the present invention increases the available time of the system by minimizing the system malfunction time due to the overload, since the application processors in the HLR system are managed by the function groups by dividing the application processor into the specific functions and the overload recovery function is performed by analyzing the overload that occurs in the system and then determining which processor function group generates the overload.

Finally, according to the present invention, since the overload occurring in the system may affect the other systems linked thereto, there is formed the overload message indicating the information of the overload generated in the system and transmitted to the other linked systems, so that the other systems may take appropriate actions to the overload.

It will be apparent to those skilled in the art that various modifications and variations can be made in the processor management method for the mobile communication HLR system of the present invention without departing from the spirit or scope of the invention. Thus, it is intended that the present invention cover the modifications and variations of this invention provided they come within the scope of the appended claims and their equivalents.

What is claimed is:

1. A processor management method for a home location register (HLR) system, the processor management method, comprising:

a step of transmitting a health check message to a processor and counting a health check count until a response message with respect to the health check message is received(step A);

a step of comparing the health check count with a first predetermined time to judge whether the system is in an overload state or not and accordingly performing a processor processing function(step B);

a step of comparing the health check count with a second predetermined time to judge whether the system operates or not and accordingly performing a processor processing function(step C); and a step of comparing the health check count with a third predetermined time to judge whether the system is abnormal or not and accordingly performing a processor processing function(step D).

2. The method according to claim 1, wherein the step B includes the sub-steps of:

determining whether the system is in the overload state when the health check count exceeds the first predetermined time;

when the system is determined to be the overload state, performing an overloading process corresponding to each overload by analyzing contents of the overload;

when the system is determined not to be the overload state, performing the step C.

3. The method according to claim 2, wherein the sub-step of performing the overload process further includes:

setting an overload message in accordance with a result of the overload analysis and transmitting the overload message to other systems.

4. The method according to claim 3, wherein the overload message consists of a field indicating the overload message, a field indicating a number of a system wherein the overload occurs, a field indicating a type of the overload in detail, a field indicating a level of the overload, and a field describing the overload.

5. The method according to claim 4, wherein in the field indicating the type of the overload predetermined values are set corresponding to a system overload, an interface related overload, a location and service related overload, a call process related overload, an additional service related overload and a system state related overload.

6. The method according to claim 2, wherein the first predetermined time is set as a maximum limit time for receiving the response message from the processor with respect to the health check message.

7. The method according to claim 1, wherein the step C includes the sub-steps of:

determining whether or not the system operates when the health check count exceeds the second predetermined time;

performing the step D when the system operates; and suspending and then restarting the processor when the system does not operate.

8. The method according to claim 7, wherein the second predetermined time is set as a maximum limit time for processing the overload process.

9. The method according to claim 1, wherein the step D includes the sub-steps of:

suspending and restarting the processor when the health check count exceeds the third predetermined time; and performing the processor processing function when the health check count does not exceed the third predetermined time.

10. The method according to claim 9, wherein the third predetermined time is set as a maximum limit time for the processor to process the message.

11. A processor management method for a home location register (HLR) system, the processor management method, comprising:

a step of transmitting a health check message to a processor and counting a health check count until a response message with respect to the health check message is received(step A);

a step of determining whether or not the system is in the overload state when the health check count exceeds a first predetermined time(step B);

a step of performing an overloading process corresponding to each overload state by analyzing contents of the overload when the system is determined to be the overload state(step C);

a step of determining whether or not the system operates when the health check count exceeds a second predetermined time(step D);

a step of comparing the health check count with a third predetermined time when the system operates(step E); and a step of suspending and restarting the processor when the health check count exceeds the third predetermined time(step F).

12. The method according to claim 11, wherein when the system is determined not to be the overload state in the step B, the step D is performed.

13. The method according to claim 11, wherein when it is determined in the step D that the system does not operate, the processor is suspended and restarted.

14. The method according to claim 11, further comprising, after the step C, setting the analyzed overload information as a predetermined message type and transmitting it to other systems.

15. The method according to claim 11, wherein the first predetermined time is set as a maximum limit time for receiving the response message from the processor with respect to the health check message.

16. The method according to claim 11, wherein the second predetermined time is set as a maximum limit time for processing the overload.

17. The method according to claim 11, wherein the third predetermined time is set as a maximum limit time for the processor to process the message.

18. An overload processing method for a mobile communication home location register (HLR) system comprising the steps of:

checking a message queue of each processor, collecting system information, and identifying whether or not an overload occurs;

analyzing the overload if it occurs, and setting a predetermined form of overload message;

transmitting the set overload message to a related operating system; and restoring the overload of the corresponding system according to the analyzing result.

19. The method according to claim 18, wherein the overload message consists of a field indicating the overload message, a field indicating a number of a system wherein the overload occurs, a field indicating a type of the overload in detail, a field indicating a level of the overload, and a field describing the overload.

20. The method according to claim 19, wherein in the field indicating the type of the overload predetermined values are set corresponding to a system overload, an interface related overload, a location and service related overload, a call process related overload, an additional service related overload and a system state related overload.

* * * * *